United States Patent
Block et al.

(10) Patent No.: US 10,505,729 B2
(45) Date of Patent: Dec. 10, 2019

(54) SECURE DATABASE FEATURING SEPARATE OPERATING SYSTEM USER

(71) Applicant: SAP SE, Walldorf (DE)

(72) Inventors: Meinolf Block, Heidelberg (DE);
Christoph Hohner, Mannheim (DE);
Martin Schindewolf, Walldorf (DE);
Sascha Zorn, Schwetzingen (DE)

(73) Assignee: SAP SE, Walldorf (DE)

( * ) Notice: Subject to any disclaimer, the term of this patent is extended or adjusted under 35 U.S.C. 154(b) by 199 days.

(21) Appl. No.: 15/347,431

(22) Filed: Nov. 9, 2016

(65) Prior Publication Data
US 2018/0131517 A1 May 10, 2018

(51) Int. Cl.
*H04L 9/00* (2006.01)
*G06F 12/14* (2006.01)
*H04L 9/08* (2006.01)
*G06F 21/62* (2013.01)
*H04L 9/32* (2006.01)

(52) U.S. Cl.
CPC ........ *H04L 9/0894* (2013.01); *G06F 21/6227* (2013.01); *H04L 9/0891* (2013.01); *H04L 9/3226* (2013.01); *H04L 9/3236* (2013.01)

(58) Field of Classification Search
CPC ... H04L 63/0428; H04L 9/00; H04L 2463/00; G06F 12/14
See application file for complete search history.

(56) References Cited

U.S. PATENT DOCUMENTS

| | | |
|---|---|---|
| 6,947,556 B1* | 9/2005 | Matyas, Jr. ......... G06F 21/6209 380/281 |
| 2004/0107416 A1* | 6/2004 | Buban ..................... G06F 8/658 717/170 |
| 2007/0271461 A1* | 11/2007 | Hardy .............. G01R 31/31705 713/176 |
| 2014/0046909 A1* | 2/2014 | Patiejunas ......... G06F 17/30289 707/687 |
| 2016/0283728 A1* | 9/2016 | Antonopoulos .... G06F 21/6209 |

* cited by examiner

*Primary Examiner* — Izunna Okeke
(74) *Attorney, Agent, or Firm* — Fountainhead Law Group P.C.

(57) ABSTRACT

Embodiments manage access to cryptography keys for database data, within a secure key store of a local key server owned by a new (security) operating system (OS) user separate from an original default OS user. Existing principles governing distinct OS user access privileges engrained within the OS itself, are leveraged to preclude the default OS user from accessing files of the new security OS user. Embodiments thus segregate the right to read secure cryptography keys of a secure key store, from the right to administer database installation on the OS level. While the original default OS user retains access to the encrypted data, the new security OS user now owns the cryptography key necessary to decrypt that database data. Thus, the default OS user is denied enough information to unlock the database data, enhancing its security. Embodiments are particularly useful for promoting data security in cloud setups and multi-tenant databases.

10 Claims, 6 Drawing Sheets

SECURE DATABASE FEATURING SEPARATE OPERATING SYSTEM USER

BACKGROUND

Unless otherwise indicated herein, the approaches described in this section are not prior art to the claims in this application and are not admitted to be prior art by inclusion in this section.

Databases offer a useful way of storing large volumes of data that may be organized into complex data structures. Prior to the advent of the internet, databases were typically located on-premises at an enterprise, and dedicated exclusively to the storage of information of that particular enterprise. Such physical control and exclusivity of purpose helped to ensure the security of data stored within the database.

Increasingly, however, databases are located remotely from the enterprise on the cloud, and accessed over communications networks. Moreover, in the interest of cost-efficiency, a third party may administer a database whose hardware/software/infrastructure resources are shared between a plurality of enterprises (e.g., as different tenants). While reducing cost, such database-sharing arrangements implemented by a remote host, can create risks lessening the degree of security afforded to data stored within the database.

SUMMARY

Embodiments manage cryptography keys for accessing database data, within a local key server owned by a new (security) operating system (OS) user separate from an original (default) OS user. Existing principles governing distinct OS user access privileges engrained within the OS itself, are leveraged to preclude the default OS user from unauthorized access to cryptography key files of the new security OS user. Embodiments thus segregate the right to read secure cryptography keys affording access to database data in decrypted form, from the right to administer database installation on the OS level. While the original default OS user retains access to the database data in encrypted form, the new security OS user now owns the cryptography key necessary to decrypt that database data. In this manner, the default OS user is denied enough information to unlock the database data, thereby limiting access and enhancing security. Embodiments are particularly useful for promoting data security in multi-tenant databases.

An embodiment of a computer-implemented method comprises receiving a binary identifying authorized installation or update of a database system storing encrypted database data, and generating a first operating system (OS) user for the database system, the first OS user comprising a key service manager. A second OS user is generated separate from the first OS user and comprising a key server protecting a first key to decrypt the encrypted database data. The key server performs an authentication of a request for the first key from the key service manager, and the key server grants the key service manager access to the first key based upon the authentication.

A non-transitory computer readable storage medium embodies a computer program for performing a method comprising receiving a binary identifying authorized installation or update of a database system storing encrypted database data, and generating a first operating system (OS) user for the database system, the first OS user comprising a key service manager. A second OS user is generated separate from the first OS user and comprising a local key server protecting a first key to decrypt the encrypted database data. The local key server performs an authentication of a request for the first key from the key service manager, and the local key server granting the key service manager access to the first key based upon the authentication.

An embodiment of a computer system comprises one or more processors and a software program executable on said computer system. The software program is configured to cause an in-memory database engine to receive a binary identifying authorized installation or update of a database system storing encrypted database data, and generate a first operating system (OS) user for the database system, the first OS user comprising a key service manager. The software program is further configured to generate a second OS user separate from the first OS user and comprising a key server protecting a first key to decrypt the encrypted database data. The software program is further configured to perform an authentication of a request for the first key from the key service manager, and to grant the key service manager access to the first key based upon the authentication.

In some embodiments the authentication comprises verifying the binary as part of the request.

According to certain embodiments verifying the binary comprises creating a checksum and comparing the checksum to an installation snapshot.

In particular embodiments the authentication comprises checking a library referenced by the request.

In some embodiments the authentication comprises comparing the binary with data stored in the database.

According to various embodiments the authentication comprises checking if debugging is disabled.

In particular embodiments the first key is stored locally with the key server.

According to some embodiments the first key is stored remote from the key server.

In certain embodiments the first key is encrypted and access to the first key is granted utilizing a second key.

According to various embodiments the database comprises an in-memory database, and the authentication is performed by an in-memory database engine of the in-memory database.

The following detailed description and accompanying drawings provide a better understanding of the nature and advantages of embodiments.

DETAILED DESCRIPTION

Described herein are methods and apparatuses that implement database security. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Embodiments relate generally to encryption techniques in a database system. Particular embodiments describe a database system comprising a local key server running as a separate OS user for performing data decryption operations.

An issue that may arise in the management of database resources, is the potential unauthorized availability of cryptography key information allowing decryption of secure database data. For example, a relatively low-level technician at a remote host location may be tasked with providing routine database support. However, that technician's status likely does not also entail access to the sensitive information stored within the database (e.g., for multiple different possible tenants).

In order to perform database support, the technician is granted access to the operating system (OS) of the database. This allows the technician to routinely start up the OS automatically after a power failure, system crash, or instance crash, without having to type in additional credentials, secure additional approval, etc.

Such an individual technician who is logging on to the system would be afforded access rights of a default OS user. That default OS user may encounter reduced security measures, easing potential access to cryptography keys used to decrypt database data.

Thus, a (potentially low-status) individual gaining OS-level access to administrate installation of an instance of the OS for the database system, may undesirably also be afforded reduced-security access to sensitive cryptography keys.

Accordingly, embodiments relate to managing access to cryptography keys for database data, within a secure key store of a local key server. A new (security) OS user is created separate from an original default OS user. Existing principles governing distinct user access privileges that are part of the OS itself, are leveraged in order to preclude the default OS user from accessing files of the new OS user. Embodiments thus segregate the right to read secure cryptography keys of a secure key store, from the right to administer database installation on the OS level. While the original default OS user retains access to the database data in encrypted form, the new security OS user now owns the cryptography key necessary to decrypt that database data. In this manner, the default OS user is denied enough information to unlock the database data, enhancing its security. Embodiments are particularly useful for promoting data security in multi-tenant databases.

Figure 1:
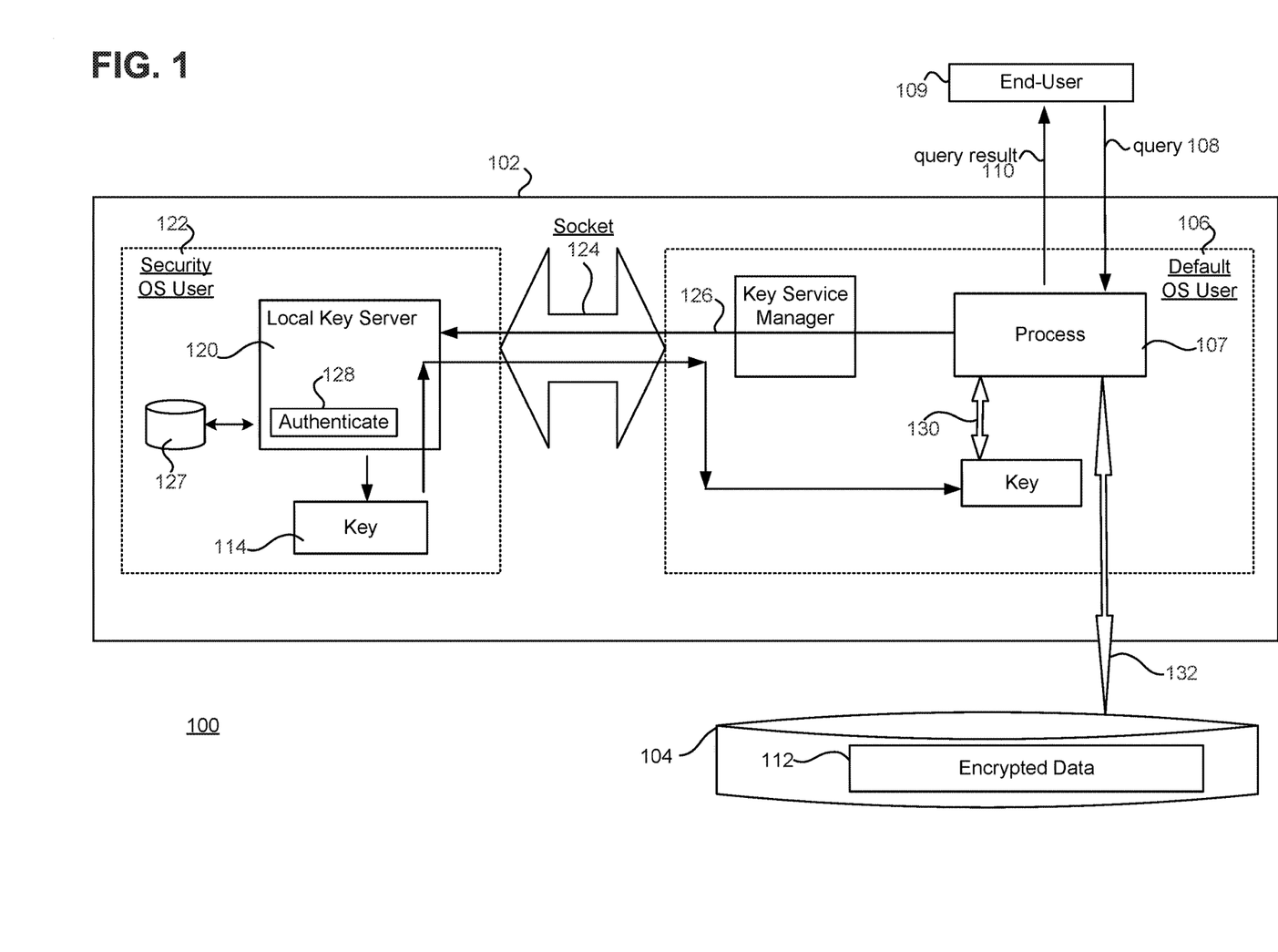
FIG. 1 shows a simplified view of a system according to an embodiment.

FIG. 1 shows a simplified view of a system according to an embodiment. Specifically, system 100 comprises database server 102 which is in communication with database 104.

The database server includes a default OS user 106, which is configured to run certain database processes. An example of such a database process is to receive a query 108 (e.g., in Structured Query Language—SQL) from an end-user 109, to process that query upon the database, and then return a responsive query result 110.

It is noted that the data 112 of the database is stored in encrypted form. In order to return a responsive query result, the default OS user must be able to apply a key 114 to decrypt the database data. As mentioned above, however, granting access to the database data in unencrypted form is not desirable for all possible OS users (e.g., low-level support technicians).

Accordingly, in order to prevent access (malicious or otherwise) to the security key, a local key server 120 is introduced running as a separate (security) OS user 122. Any OS user attempting to access the cryptography keys must do so through the separate key server.

In particular, a database system process would communicate with a socket 124, and open the socket to the key server. The local key server could then verify the authenticity of the default OS user process according to an established process identifier 126.

For example the database system process may include particular binary files and/or reference certain libraries, etc. while seeking access the encrypted database data. The key server can refer to stored data 127 in order to perform authentication 128 that the request for data access from the default OS user process is in fact appropriate.

This authentication can rely upon properties of the process identifier, such as:
confirming that the binary received from the default OS user was signed with private vendor keys and originates from an original binary package for the installation and/or maintenance of the database system;
checking for any suspicious libraries loaded by the process seeking access; and/or
checking if system is properly hardened (e.g. system-wide debugging is disabled in a Linux kernel until the reboot has occurred).

Still other approaches verifying authenticity of the default OS user process seeking security keys, are described later below in connection with the example.

Once authentication has been successfully accomplished by the local key server, the decryption key is sent via the socket from the security OS user to the default OS user. The default OS user is now free to reference 130 the key in order to decrypt data stored in the database, and to return corresponding data 132 responsive to the query.

Example

Figure 2:
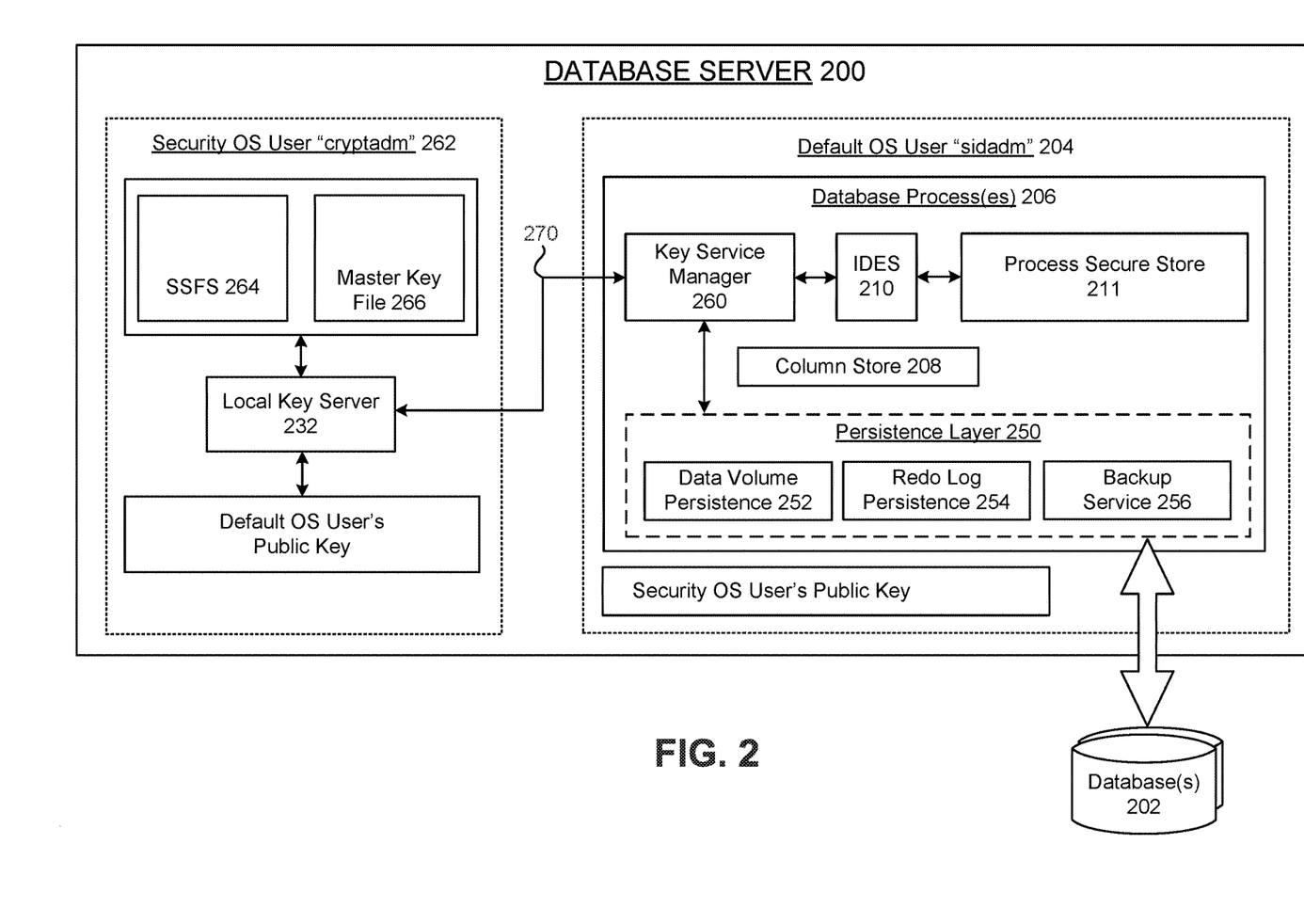
FIG. 2 shows a simplified view of an example of a database server configured according to an embodiment.

One particular example is now presented in connection with FIG. 2. Specifically, this example relates to the HANA in-memory database platform available from SAP SE of Walldorf, Germany.

A primary function of HANA as a database server is to store and retrieve data as requested by various applications. In addition, HANA may perform advanced analytics (e.g., predictive analytics, spatial data processing, text analytics, text search, streaming analytics, graph data processing) and includes extract, transform, and load (ETL) capabilities and an application server.

FIG. 2 shows a simplified view of the HANA database server 200 configured according to an embodiment, in communication with the database 202. When an instance of an OS user for the database system is installed and/or updated, an OS user name is generated by the database installer.

During normal operation, database processes corresponding to a database instance are run by a default OS user 204 having a default OS user name. Here, the default OS user name is: "sidadm".

The default user runs a database process 206 that includes a column store 208 comprising an in-memory representation of the data. The Integrated Data Encryption Service (IDES) 210 is a component that allows applications to store selected data in encrypted form, by ensuring that the application has only access to its own keys. Secure Store component 211 represents database tables containing data encrypted with a key managed by the IDES.

The HANA database server includes persistence layer 250. The persistence layer provides persistence of the execution of a system, usually by writing its state to files or to a database.

In computer science, "persistence" refers to the characteristic of state that outlives the process that created it. This is achieved in practice by storing the state as data in computer data storage. Programs transfer data to and from storage devices and provide mappings from the native programming-language data structures to the storage data structures.

Three different types of persistence are shown in FIG. 2. Data Volume Persistence 252 is the HANA component responsible for reading (writing) data volumes from (to) the file system.

Redo Log Persistence 254 is the HANA component responsible for reading (writing) redo-log entries from (to) the file system. The Backup Service 256 is the HANA component responsible for reading (writing) backup data from (to) the file system or the back_int-interface.

The default OS user further includes a key service manager 260. The key service manager is a shared component that provides access to encryption keys that are stored and controlled from outside the default OS user.

In particular, this key service manager functions as the database system-side adapter for accessing the local key server present on a second OS user 262. This second (security) OS user has the username: "cryptadm".

The cryptadm security OS user is present on the same host as the sidadm default OS user, thereby allowing cryptadm to check some OS settings and make sure the system is properly hardened, as described above. For example cryptadm checks the binaries of sidadm for authentication purposes.

This checking could not be accomplished if sidadm and cryptadm were operating on a different host. Specifically, an external machine would need some private key (such as a password) to authenticate against the key server. Such a private key could not be protected against an OS admin having the same privilege as the HANA OS itself. Accordingly, the cryptadm security OS user utilizes a separate process running on the same host.

In order to effectively segregate security functions from the default OS user, the security OS user owns the Secure Store in the File System ("SSFS") 264. The SSFS comprises an encrypted file or other data container containing the keys for unlocking the data stored in the database system.

The SSFS can be encrypted using a master key 266. The master key for the SSFS may also be located in the file system.

The SSFS can be unlocked by the master key. Keys stored in the SSFS can be used to unlock the data persisted in the database system.

In one embodiment, each key may correspond to a different purpose. For example, the SSFS can contain a key for the persistence encryption.

When the data is encrypted (e.g., persistence encryption is activated), the key for the encrypted data can be stored in the SSFS. The SSFS can be locked using the master key to provide an additional layer of security.

There is also a key for the IDES. The IDES may include a different key store that stores keys specific to the applications running on the database system.

For its own persistence, the Local Key Server can use the SSFS, which is secured with a Master Key. An integration with third-party hardware solutions is also possible.

Independent of the specific persistence implementation, the persisted data is also backed up. That is, the key server must somehow connect to the backup/restore cycle for its persisted keys.

These backups are encrypted as well. The local key server key is secured independently of that backup encryption, so that the dual control of key management (cryptadm) versus data management (sidadm) is not broken.

In its security role, the second OS user has several possibilities to verify authenticity of a requesting process from the default OS user seeking cryptography key access. For example, the requesting process may be a binary signed with a private key of the vendor (e.g., SAP SE).

A normal OS level user running as sidadm, could not fake an authorized database system binary now seeking access to the secure keys. According to embodiments, only processes contacting the local key server 232 from the database system and verified to be secure, are allowed access to the keys. According to particular embodiments, sidadm binaries do not access the keys directly, but a copy of the keys will be handed out if the caller has been verified.

This does not necessarily include any OS level user. For example, as described herein the keys can be stored securely as a different OS user. Only signed database system binaries can access the secure keys stored in the local key server's persistent storage.

In certain embodiments, the SAP host agent may be used to start (directly or indirectly) both the key server and the HANA processes. In such cases, the SAP host agent could hand over a secret to both (key server and HANA) processes. That secret can be used to verify that no other unauthorized process is attempting to steal the keys.

The key server opens a socket 270, and a HANA database system process connects to the socket. The OS alerts the security OS user which binary (program) is seeking to make contact.

The security OS user can have the OS show the binary file of the process. Then, a checksum over this binary can be created, and that checksum verified against an installation or maintenance snapshot.

According to particular embodiments, SAP ships a signed manifest in every release/update containing all hashes of all included files of an installer; this can be reused by the key server. Thus every HANA installation and/or update provides a set of hashes of all the database system binaries signed with a private key. So, the local key server of the cryptadm security OS user will have the public key to open the signed list of hashes. The local key server can hash against the binary of any contacting process, to authenticate that the binary of the process is indeed present in a list of verified signed database system binaries.

Access to the database decryption keys to the default OS user sidadm may be afforded by encrypting those keys with a public key of the default OS user before transferring the secure keys to the local key server. Then, the user data is encrypted with a private key of the separate (security) OS user. Thus, the key used to decrypt database data may itself be provided to the default OS user through a separate encryption/decryption process. Those keys can be cached by the default OS user, but are not persisted in accessible form for the default OS user.

Embodiments are not limited to the particular example shown in FIG. 2, and alternative embodiments may be implemented. For example, the key service manager may manage a mapping between an explicit purpose and a purpose-identifier (ID).

In such embodiments the local key server only has to deal with the purpose-ID(s). While these purpose-IDs could be mere numbers, the purpose itself is more complex (URL-like, or json) in order to cover a variety of usecases.

Moreover, it is noted that backups of the local key server consume processing, memory, and bandwidth resources. Thus certain embodiments may support advance key-generation (including backup), so that switching to a new key can be achieved more quickly.

Further, the changes for the data volume, redolog, and backup encryption can be implemented once a working key service manager with the correct API is available. Until the local key server is available, an intermediate version of the key manager with its own persistence, may be implemented.

While the particular embodiments described so far utilize local key storage, this is not required. According to some embodiments, a remote key server could be utilized.

Figure 3:
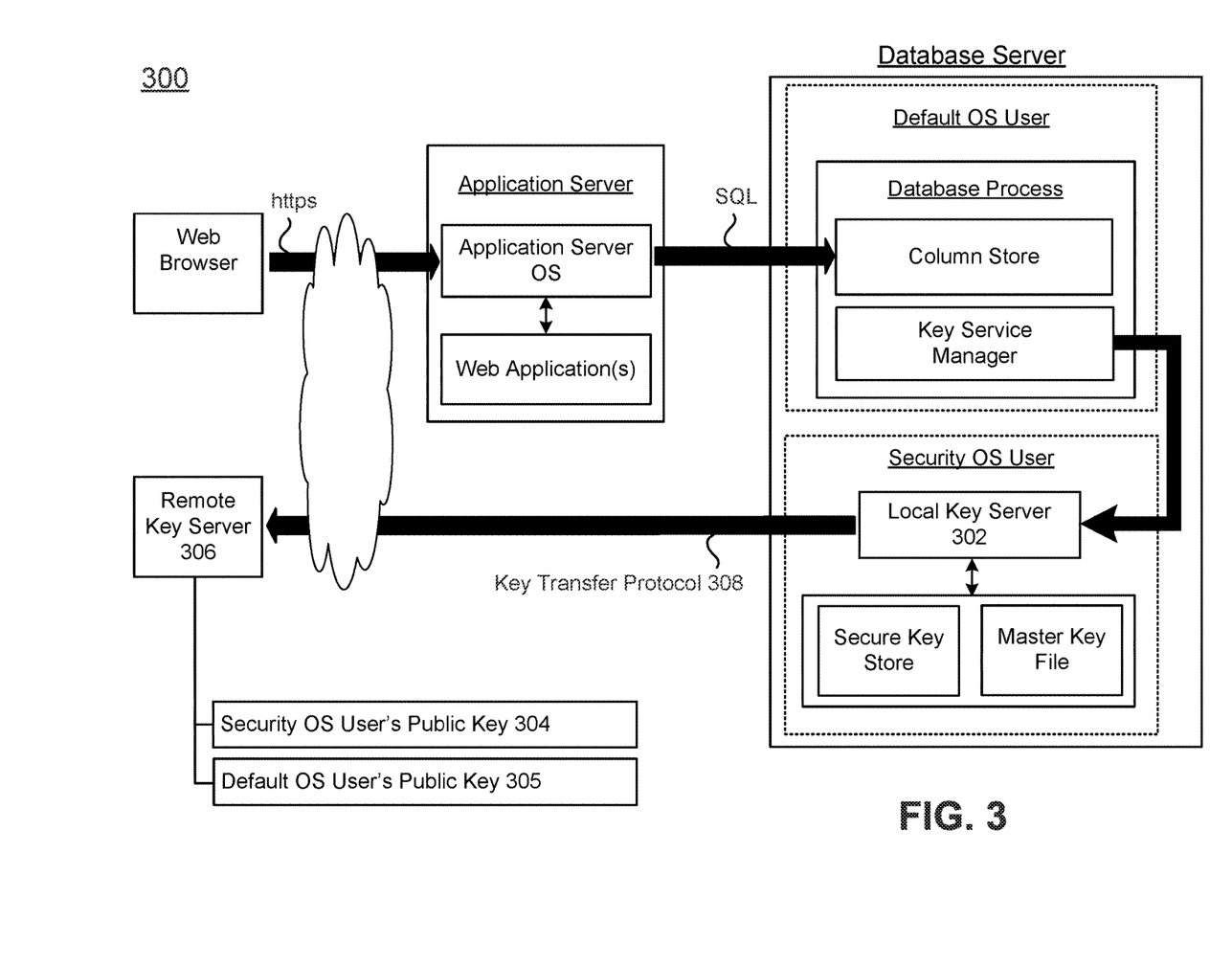
FIG. 3 shows another embodiment of a system.

FIG. 3 shows a simplified view of such an alternative system embodiment 300. Here, the local key manager 302 requests keys from a remote key server 306 utilizing a key transfer protocol 308 that utilizes public keys 305, 304 for encryption. This ensures that transported keys are only accessible to processes that have corresponding private keys. Hence, in case the local key server did not request keys from remote key server, it can discard the response. In case the local key server requested keys from remote key server, the local key server can decrypt with private key corresponding to 304 and sign before forwarding message to the requesting database process. The local key server cannot access transported keys, as the message is still encrypted with public key 305. The database process can check the signature with key 304 and decrypt message with private key corresponding to key 305.

The particular embodiment of FIG. 3, shows the remote key server run in a different cloud installation. Alternatively however, the remote key server could be on the customer side.

Figure 4A:
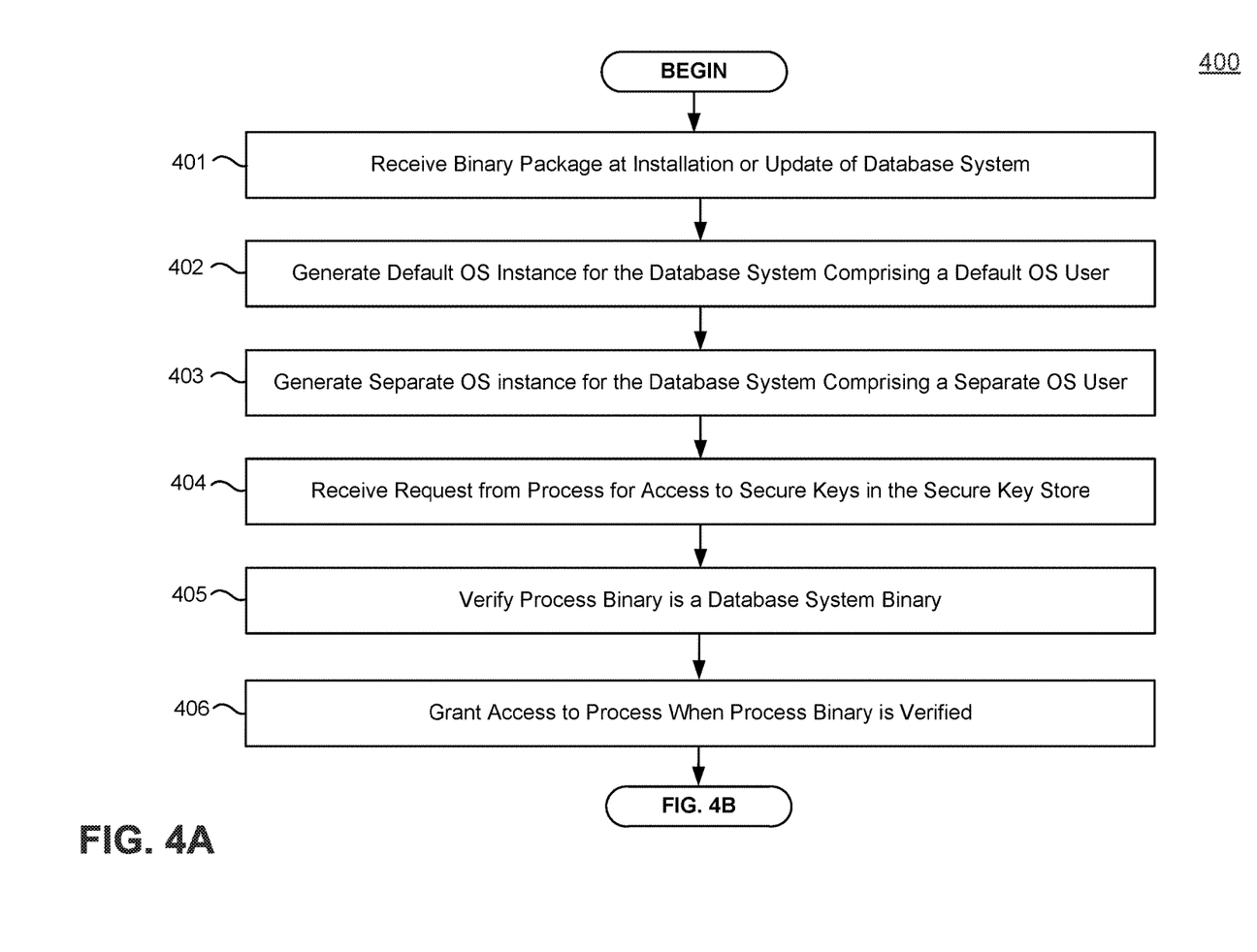
FIGS. 4A-B are flow charts for an example embodiment of a process for implementing a local key server running as a separate OS user in a database system.
Figure 4B:
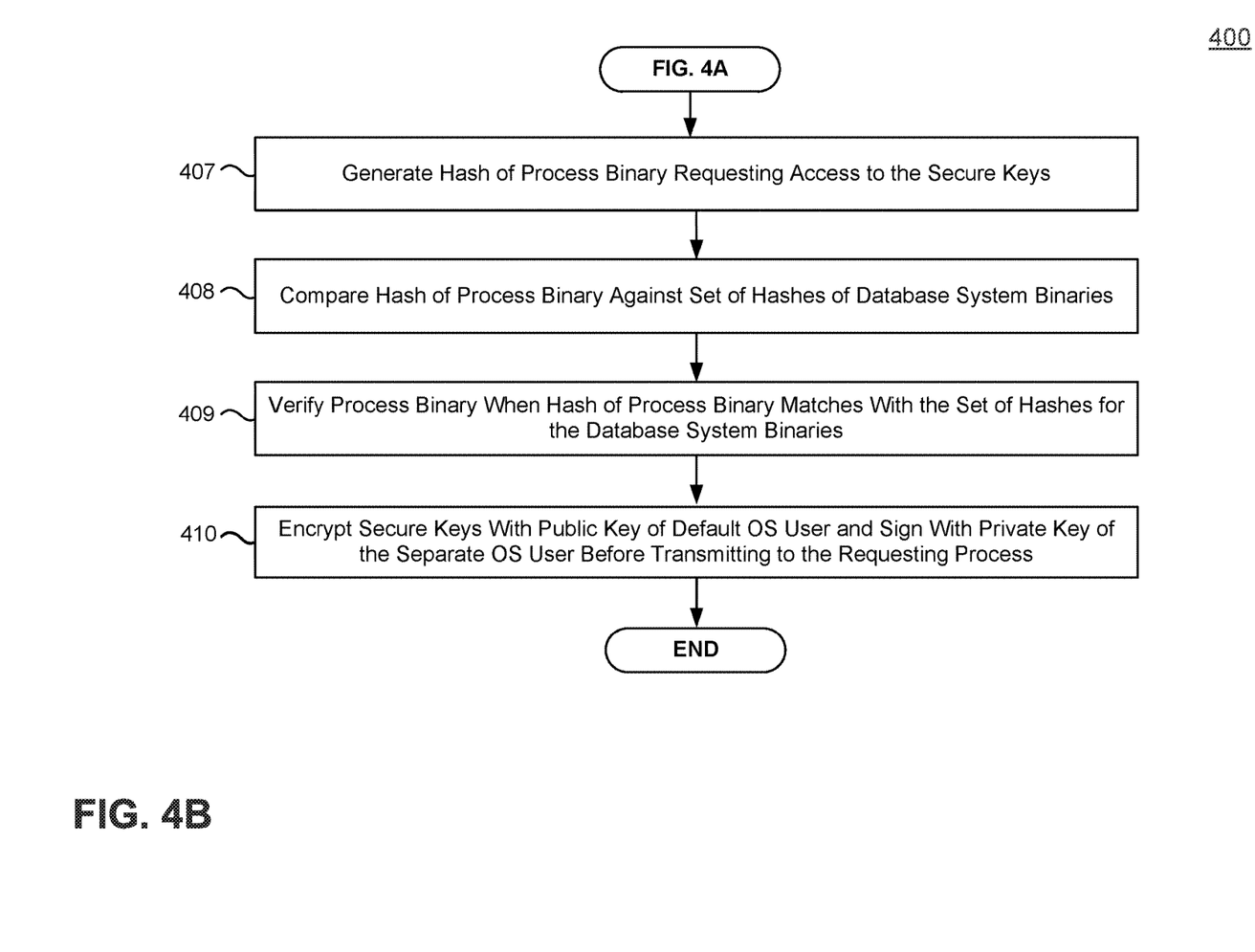

FIGS. 4A-4B depict flow charts for an example embodiment of a process for implementing a local key server running as a separate OS user in a database system. It is noted that the processes described below are exemplary in nature and are provided for illustrative purposes and not intended to limit the scope of the disclosure to any particular example embodiment. For instance, methods in accordance with some embodiments described in this disclosure may include or omit some or all of the operations described below, or may include steps in a different order than described in this disclosure. The particular methods described are not intended to be limited to any particular set of operations exclusive of all other potentially intermediate operations. In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

In one embodiment, the process 400 may be performed at a database system comprising a database server in communication with one or more databases. The database server may include at least one processor and a memory storing programmed computer code executable by the processor for implementing an additional level of security for the database system.

In the illustrated embodiment, process 400 begins at operation 401 by receiving a binary package comprising an installation or update of the database system. In response to receiving the binary package, process 400 can generate a default OS instance for the database system (operation 402). In one embodiment, the default OS instance may include a default OS user that is operable to manage access to user data stored by the database system in the one or more databases. Process 400 continues by generating another OS instance for the database system separate from the default OS instance (operation 403). This second OS instance may include a local key server (or service) running as a separate OS user in the database system. The separate OS user may be operable to manage access to one or more secure keys used for unlocking the user data.

In one embodiment, the separate OS user is generated in response to the installation or update of the database system. The separate OS user is provided with the secure key store and master key file. The local key server may include a secure key store secured by a master key stored in a master key file. The secure key store can be adapted for storing the secure keys in its own persistence in which the secure keys are securely stored. The master key can unlock the secure key store to access the secure keys, and the secure keys can unlock the user data stored in the database system.

In at least certain embodiments, the database system may be configured such that no single OS user in the database system has enough information to unlock the user data by itself when the local key server is running as the separate OS user. Such a database configuration can prohibit or exclude the default OS user access to the secure keys managed by the separate OS user and can prohibit or exclude the separate OS user access to the user data managed by the default OS user.

Process 400 continues by receiving a request from a process for access to one or more secure keys in the secure key store of the local key server (operation 404) and verifying that the binary of the process requesting access is a database system binary that originates from the database system (operation 405). The process may then be granted access to the secure keys in the secure key store when the process binary is verified (operation 406). In one embodiment, only processes that originate from the database system are granted access by the local key server.

Process 400 continues at FIG. 4B, which depicts further details of the operations for verifying that the binary of the process requesting access is a database system binary that originates from the database system. Process 400 continues by generating a hash of the process' binary (operation 407) and comparing it against a set of hashes of the database system binaries (operation 408). In one embodiment, upon installation or update of the database system, the database system binaries are unpacked from the binary package and hashed to generate the set of hashes of the database system binaries, which can then be compared with the hash of the binary of the process requesting access to the secure keys in the secure key store of the local key server.

Process 400 continues by verifying the process binary when the hash of the process binary matches at least one hash in the set of hashes of the database system binaries (operation 409). A hash function may refer to any function that can be used to map data of arbitrary size to data of fixed size. The values returned by a hash function are called hash values, hash codes, hash sums, or simply hashes. One use is a data structure called a hash table, widely used in computer software for rapid data lookup. Hash functions can accelerate table or database lookup by detecting duplicated records in large files. A cryptographic hash function allows one to easily verify that some input data maps to a given hash value, but if the input data is unknown, it is deliberately difficult to reconstruct it (or equivalent alternatives) by knowing the stored hash value.

It should be noted that although embodiments are presented in terms of hash functions, other fingerprinting and/or security techniques may also be used such as checksums, document fingerprints, randomized functions, error correcting codes (ECCs), forward error correction (FEC) codes, ciphers, etc. The presented embodiments are not intended to be limited to any particular fingerprinting technique or techniques.

In at least certain embodiments, an additional privilege above OS access privilege is required to access the secure key store of the local key server. Separating the OS users prohibits access by one OS user of another OS user's files. Because of this, OS users in a database system configured according to the embodiments described herein are not able to access the secure key store of the local key server owned the separate OS user.

Once the process binary is verified as a binary originating from the database system, the process can be granted access to the secure keys. Process 400 continues by the local key server encrypting secure keys with the public key of the default OS user and signing with the private key of the separate OS user, before the local key server transmits data to the requesting process (operation 410). In one embodiment, the secure keys stored in the secure key store can be accessed using a key reference of a requesting database system process such as from the key service manager discussed above.

At least certain embodiments may be configured for implementation using in-memory analytics. In-memory analytics is an approach to querying data when it resides in a computer's random access memory (RAM) as opposed to querying data that is stored on separate physical disks. This can result in vastly shortened query times, allowing business intelligence and analytics applications to support faster business decisions. In addition to providing fast query response times, in-memory analytics can reduce or eliminate the need for data indexing and storing pre-aggregated data. This can reduce IT costs and allow faster implementation of business intelligence and analytics applications.

In one embodiment, a system described in this disclosure can be implemented on a SAP HANA platform, which is an in-memory, column-oriented, relational database management system developed and marketed by SAP SE based in Walldorf, Germany. The HANA platform allows data analysts to query large volumes of data in real time, and its in-memory database infrastructure can free analysts from having to continuously load or write-back data to physical disks. Certain embodiments may leverage the processing power of an in-memory database engine in order to function in one of the roles and/or perform one or more of the tasks that have been described above.

Figure 5:
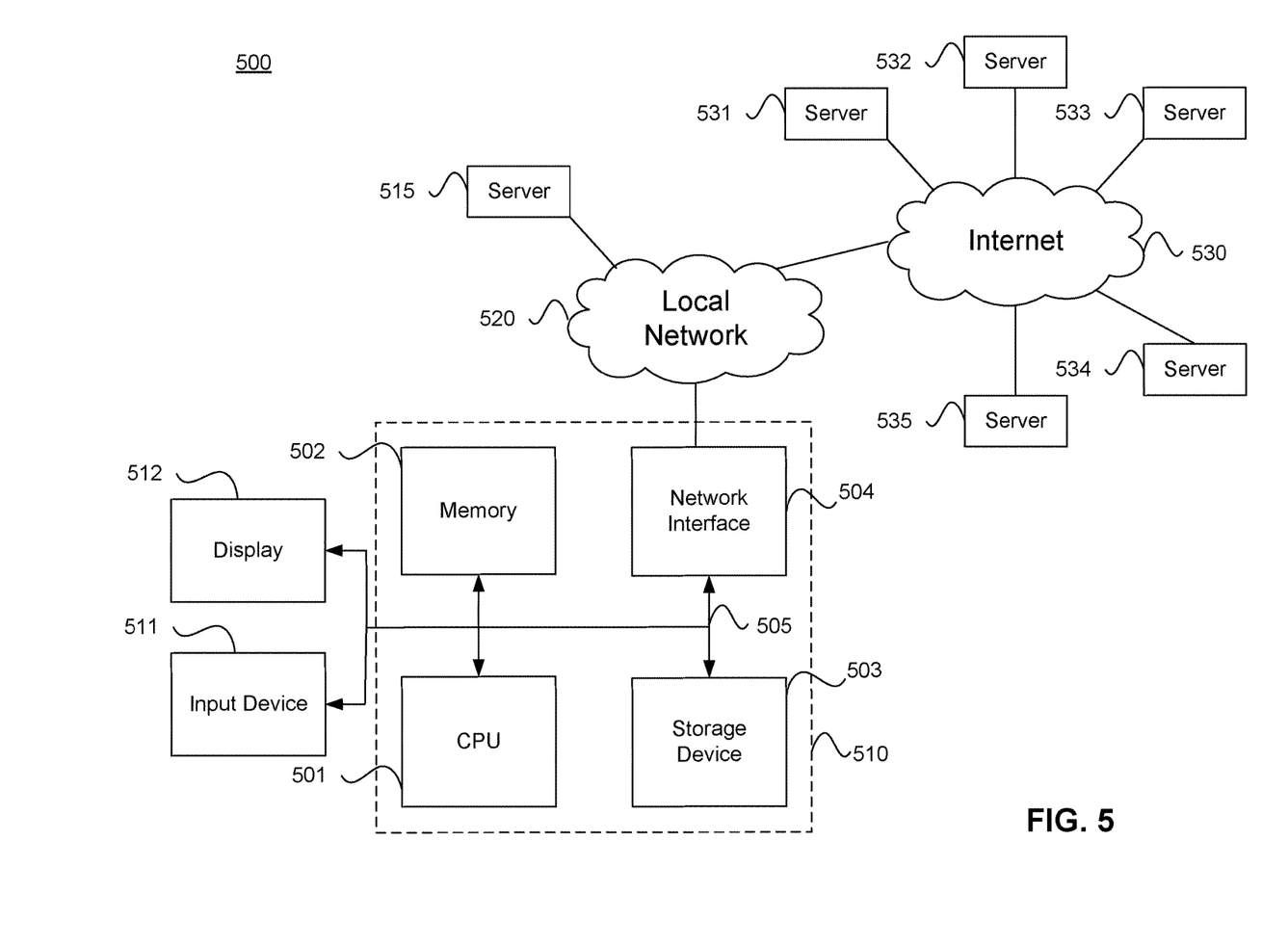
FIG. 5 illustrates an example computer system.

An example computer system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving a binary identifying authorized installation or update of a database system storing encrypted database data;
generating a first operating system (OS) user for the database system, the first OS user comprising a key service manager;
generating a second OS user separate from the first OS user and comprising a key server protecting a first key to decrypt the encrypted database data;
a default process of the first OS user opening a socket to the key server;
the key server performing an authentication of a request for the first key from the key service manager, the request including the binary communicated via the socket, wherein the database system comprises an in-memory database, and the authentication is performed by an in-memory database engine of the in-memory database, and wherein the authentication comprises,
creating a checksum over the binary, and
verifying the checksum against an installation or maintenance snapshot; and
the key server granting the key service manager access to the first key via the socket based upon the authentication, wherein,
the authentication comprises checking a library referenced by the request, and
the first key is encrypted, and access to the first key is granted utilizing a second key.

2. A method as in claim 1 wherein verifying the binary comprises:
creating a checksum; and
comparing the checksum to an installation snapshot.

3. A method as in claim 1 wherein the authentication comprises comparing the binary with data stored in the database.

4. A method as in claim 1 wherein the authentication comprises checking if de-bugging is disabled.

5. A method as in claim 1 wherein the first key is stored locally with the key server.

6. A method as in claim 1 wherein the first key is stored remote from the key server.

7. A non-transitory computer readable storage medium embodying a computer program for performing a method, said method comprising:
receiving a binary identifying authorized installation or update of an in-memory database system storing encrypted database data;
generating a first operating system (OS) user for the database system, the first OS user comprising a key service manager;
generating a second OS user separate from the first OS user and comprising a local key server protecting a first key to decrypt the encrypted database data;
a default process of the first OS user opening a socket to the key server;
the local key server performing an authentication of a request for the first key from the key service manager, the request including the binary communicated via the socket, wherein the authentication is performed by an in-memory database engine of the in-memory database, and wherein the authentication comprises,
creating a checksum over the binary, and
verifying the checksum against an installation or maintenance snapshot; and
the local key server granting the key service manager access to the first key via the socket based upon the authentication, wherein,
the authentication comprises checking a library referenced by the request, and
the first key is encrypted, and access to the first key is granted utilizing a second key.

8. A computer system comprising:
one or more processors;
a software program, executable on said computer system, the software program configured to cause an in-memory database engine to:
receive a binary identifying authorized installation or update of an in-memory database system storing encrypted database data;
generate a first operating system (OS) user for the database system, the first OS user comprising a key service manager;
generate a second OS user separate from the first OS user and comprising a key server protecting a first key to decrypt the encrypted database data;
open a socket to the key server;
perform an authentication of a request for the first key from the key service manager, the request including the binary communicated via the socket, wherein the authentication comprises,
creating a checksum over the binary, and
verifying the checksum against an installation or maintenance snapshot; and
grant the key service manager access to the first key via the socket based upon the authentication, wherein,
the authentication comprises checking a library referenced by the request, and
the first key is encrypted, and access to the first key is granted utilizing a second key.

9. A computer system as in claim 8 wherein the first key is stored locally with the key server.

10. A computer system as in claim 8 wherein the first key is stored remote from the key server.

* * * * *